Figure 1A:
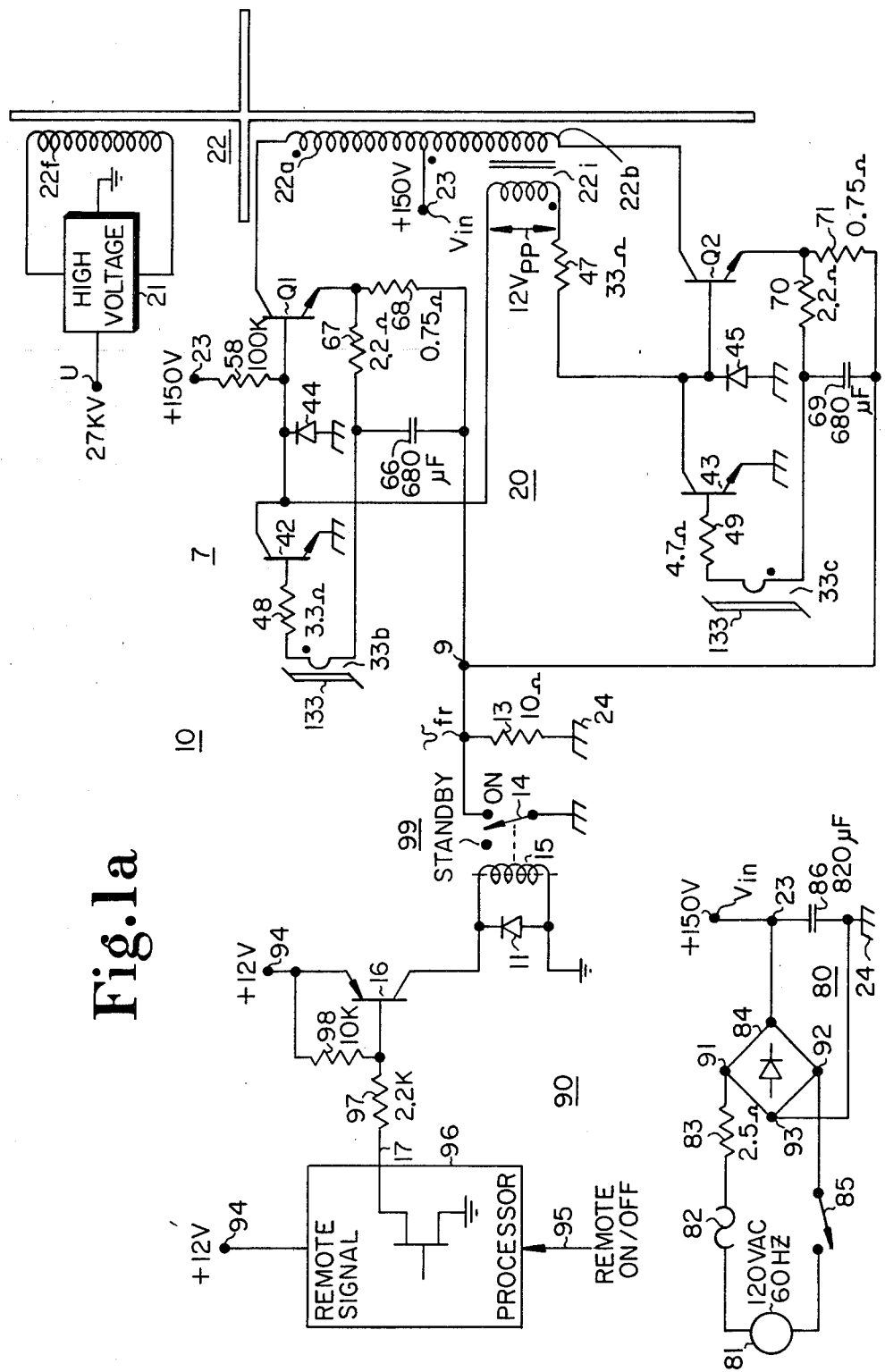

United States Patent [19]

Rinehart et al.

[11] 4,392,090
[45] Jul. 5, 1983

[54] REMOTE RESPONSIVE TELEVISION RECEIVER FERRORESONANT POWER SUPPLY

[75] Inventors: James K. Rinehart; Donald H. Willis; David W. Luz, all of Indianapolis, Ind.

[73] Assignee: RCA Corporation, New York, N.Y.

[21] Appl. No.: 322,062

[22] Filed: Nov. 16, 1981

[51] Int. Cl.³ .............................................. H01J 29/70
[52] U.S. Cl. .................................. 315/411; 358/194.1
[58] Field of Search ................. 315/411; 358/190, 194

[56] References Cited

U.S. PATENT DOCUMENTS

| | | | |
|---|---|---|---|
| 3,860,748 | 1/1975 | Everhart et al. | 178/6 |
| 4,024,577 | 5/1977 | Diethelm | 358/190 |
| 4,282,460 | 8/1981 | Luz et al. | 315/411 |

FOREIGN PATENT DOCUMENTS

| | | |
|---|---|---|
| 2620191 | 11/1977 | Fed. Rep. of Germany . |
| 2651196 | 5/1978 | Fed. Rep. of Germany . |
| 7810087 | 4/1980 | Netherlands . |

OTHER PUBLICATIONS

Laboratories RCA Ltd. Report No. MRZ-240-E, Apr. 20, 1978, "ITR Switched Mode Power Supply for Isolated Chassis and Thyristor Deflection", W. Böhringer & G. Förster.

Primary Examiner—Theodore M. Blum
Attorney, Agent, or Firm—E. M. Whitacre; P. J. Rasmussen; Joseph Laks

[57] ABSTRACT

In a television receiver with a regulated power supply that is responsive to the state of a remote on/off command signal, a power oscillator is coupled to an unregulated direct voltage source for developing an alternating input voltage of a frequency determined by the frequency of operation of the oscillator. The oscillator is provided with a frequency control terminal that controls the oscillator frequency, depending upon a control signal applied to the terminal. A ferroresonant or self-regulating circuit is energized by the alternating input voltage to produce a regulated supply voltage that in turn energizes a load circuit within the television receiver. A remote control circuit responsive to the on/off command signal applies a control signal to the frequency control terminal of the oscillator such that during the on-state of the command signal the oscillator operates at a frequency that permits normal, ferroresonant operation of the self-regulating circuit and that during the off-state of the command signal, changes the oscillator frequency to a different one that is high enough to disable the ferroresonant operation of the self-regulating circuit. The power supply is thereby placed in the standby condition wherein the television display load circuit is substantially deenergized.

13 Claims, 2 Drawing Figures

REMOTE RESPONSIVE TELEVISION RECEIVER FERRORESONANT POWER SUPPLY

This invention relates to a remote responsive ferroresonant power supply for a television display system.

A ferroresonant power supply may be used to provide a regulated ultor voltage and a regulated B+ scanning voltage for a television receiver. When operated at a relatively high input frequency, such as the horizontal deflection frequency of about 16 KHz, a ferroresonant power supply is a relatively compact and low weight unit that provides inherent output voltage regulation without the need for relatively complex and expensive electronic regulator control circuitry.

Many television receivers include remote control circuitry that provides remote on/off power control. In remote controlled switching power supplies for television receivers, the remote control circuitry may disable the switching element or otherwise alter switching to place the television receiver in the standby mode of operation.

A feature of the invention is a ferroresonant power supply for a television receiver that incorporates remote on/off power control. A power oscillator is coupled to a source of first voltage for developing an alternating input voltage of a frequency determined by the frequency of operation of the oscillator. The oscillator includes a frequency control terminal that controls the frequency of operation of the oscillator depending upon a control signal applied to that terminal. A self-regulating or ferroresonant circuit is energized by the alternating input voltage for producing a regulated supply voltage that in turn energizes a load circuit within the television display system. A remote control circuit is responsive to a remote on/off command signal for applying to the oscillator frequency control terminal a control signal such that during the on-state of the command signal the oscillator operates at a frequency that permits normal ferroresonant operation of the self-regulating circuit, and that during the off-state of the command signal, the oscillator operates at a different frequency that disables ferroresonant operation to thereby substantially deenergize the television display system load circuit.

Figure 1B:
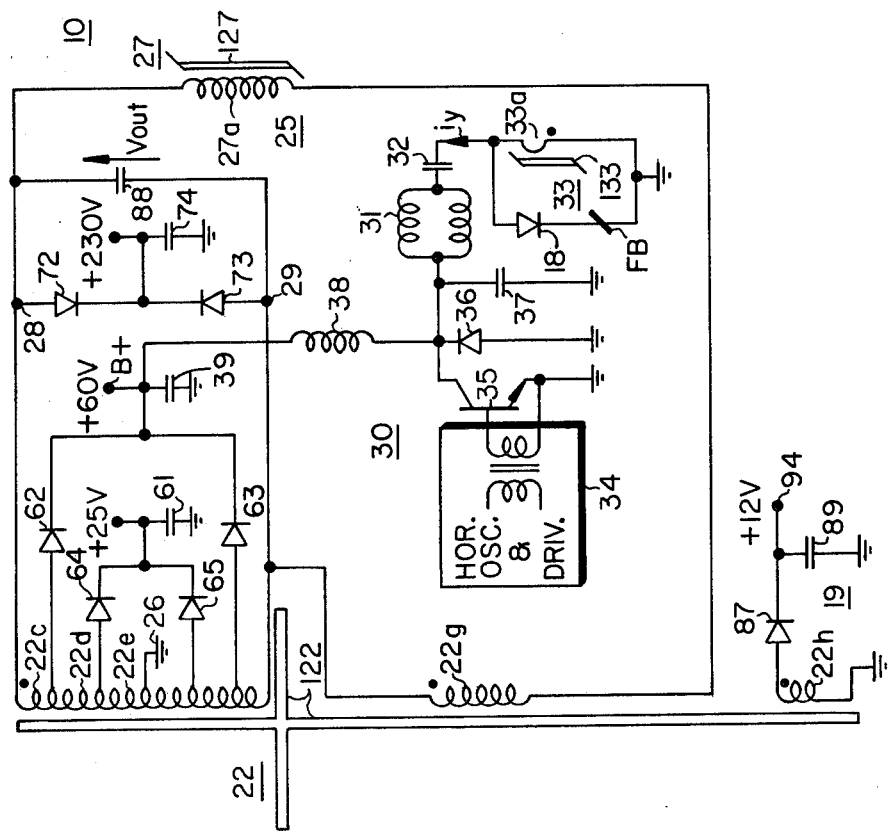

FIGS. 1a and 1b illustrate a television receiver deflection circuit and ferroresonant power supply embodying the invention that incorporates remote control circuitry.

In FIGS. 1a and 1b, a ferroresonant power supply 10 for a television receiver or television display system comprises a source 80 of unregulated direct voltage Vin and a power oscillator 7 energized thereby. Power oscillator 7 comprises a high leakage inductance transformer 22 having a primary winding comprising sections 22a and 22b coupled in a push-pull arrangement to output switching transistors Q1 and Q2 of an inverter 20.

The DC voltage source 80 comprises a source 81 of alternating polarity mains supply voltage coupled across input terminals 91 and 92 of a full-wave bridge rectifier 84 to develop the direct voltage Vin across a filter capacitor 86 coupled between a terminal 23 and a ground 24 not isolated from mains supply source. Non-isolated ground 24 is coupled to the current return terminal 93 of bridge rectifier 84. One end of mains supply voltage source 81 is coupled to terminal 91 through a fuse 82 and a current limiting resistor 83. The other end of source 81 is coupled to terminal 92 through a switch 85 that is normally in the closed position in both standby and full power modes of operation. Thus, the input voltage Vin is available for use in both modes of operation.

Alternate conduction in the collector-to-emitter main current paths of the transistors Q1 and Q2 develops a rectangular or square-wave alternating polarity input voltage across each of the primary winding sections 22a and 22b of power transformer 22. The alternating polarity square-wave voltage developed across each of the primary winding sections produces an alternating polarity supply voltage of the same frequency across each of secondary windings 22c–22f of power transformer 22. Secondary windings 22c–22e have a common center tap coupled to a chassis ground 26 that is isolated from ground 24.

The alternating polarity output voltage developed across winding 22c is full-wave rectified by diodes 72 and 73 and filtered by a capacitor 74 to develop a DC supply voltage, of illustratively +230 volts, to power such circuits as the television receiver picture tube driver circuits. The alternating polarity output voltage developed across winding 22e is full-wave rectified by diodes 64 and 65 and filtered by a capacitor 61 to develop a DC supply voltage, of illustratively +25 volts, to power such television receiver circuits as the vertical deflection circuit, the audio circuit, and the chroma-luma circuits.

The alternating polarity output voltage developed across winding 22d is full-wave rectified by diodes 62 and 63 and filtered by a capacitor 39 to develop, at a B+ terminal, a B+ scan supply voltage to energize a horizontal deflection generator circuit 30 for developing horizontal scanning current in a horizontal deflection winding 31. Horizontal deflection circuit 30 is coupled to the B+ terminal through an inductor 38 and comprises a horizontal oscillator and driver 34, a horizontal output transistor 35, a damper diode 36, a retrace capacitor 37, and the series arrangement of horizontal deflection winding 31, an S-shaping or trace capacitor 32, and a winding 33a of a saturable pulse transformer 33. Saturable pulse transformer 33 provides pulses that establish the frequency of operation of inverter 20 at the horizontal deflection frequency in synchronism with the horizontal deflection or scanning current, as will be later described.

The alternating polarity output voltage developed across a high voltage winding, secondary output winding 22f, is coupled to a high voltage circuit 21 to develop a DC ultor voltage or accelerating potential at a terminal U for the television receiver picture tube, not illustrated. High voltage circuit 21 may comprise a conventional voltage multiplier circuit of the Cockroft-Walton type, or may comprise a half-wave rectifier arrangement with a polarity of winding sections of winding 22f, the sections not being individually illustrated.

The output voltage Vout developed across secondary output winding 22c, between terminals 28 and 29, is regulated by the ferroresonant operation of a ferroresonant load circuit 25, as described in the U.S. patent application Ser. No. 220,847, filed Dec. 29, 1980, by D. H. Willis, entitled "TELEVISION RECEIVER FERRORESONANT LOAD POWER SUPPLY", and in U.S. patent application Ser. No. 255,396, filed Apr. 20, 1981, by D. H. Willis, entitled "TELEVISION RECEIVER FERRORESONANT LOAD POWER SUPPLY WITH REDUCED SATURABLE REACTOR CIRCULATING CURRENT", both applications herein incorporated by reference. Ferroresonant load circuit 25 comprises a saturable reactor 27 including a magnetizable core 127 and a winding 27a located thereon, a capacitor 88 coupled between terminals 28 and 29 and a winding 22g of transformer 22 magnetically tightly coupled to winding 22a and conductively coupled in series with saturable reactor winding 27a across capacitor 88.

By being coupled to transformer secondary output winding 22c, ferroresonant load circuit 25 acts as a regulating load circuit to maintain the voltage across winding 22c as the regulated voltage Vout. With the voltage across secondary output winding 22c regulated by the ferroresonant operation of ferroresonant load circuit 25, the output voltages across all the other secondary windings that are tightly coupled to winding 22c, including high voltage winding 22f, are also regulated. Because of the loose magnetic coupling between each of the primary winding sections 22a and 22b, and each of the secondary windings 22c-22f, the voltage across the secondary windings can remain relatively unchanged in amplitude or half-cycle area, even though the voltages across the primary winding sections vary in amplitude.

Transformer 22, in combination with capacitor 88, develops an exciting current in saturable reactor winding 27a for generating a combined magnetic flux in core 127 that links winding 27a to produce the alternating polarity output voltage Vout. To regulate Vout by ferroresonant operation, capacitor 88 generates a circulating current during each half cycle of the alternating polarity output voltage that aids in magnetically saturating the core section of magnetizable core 127 that is associated with the reactor winding.

As the saturable core section goes into saturation and comes out of saturation, the inductance exhibited by saturable reactor winding 27a switches between a low inductance and a high inductance. This switching action is a function of the saturation characteristics of the magnetizable material of core 127. The amplitude of the output voltage, the half-cycle area of the output voltage, or both the amplitude and half-cycle area are regulated by this switching action against changes in the amplitude of the DC input voltage developed across terminals 23 and 24 and against changes in the loading on the various DC supply terminals including the ultor supply terminal U.

Inverter 20, in addition to switching transistors Q1 and Q2, includes damper diodes 44 and 45, each paralleling a respective base-emitter current path of the switching transistors, and a feedback winding 22i of transformer 22 tightly coupled magnetically to primary winding sections 22a and 22b and conductively coupled to the bases of transistors Q1 and Q2, respectively. The emitter electrodes of switching transistors Q1 and Q2 are coupled to a frequency control terminal 9 of controllable oscillator 7 through respective resistors 68 and 71. Frequency control terminal 9 is coupled to nonisolated ground 24 by an impedance, resistor 13, that is paralleled by the mechanical on/off switch portion 14 of a relay 99. Relay 99 is energized by the current in relay coil 15 to actuate the mechanical switch 14 into the closed position to make contact with the ON terminal of the switch.

Relay 99 is part of a remote control circuit 90 for the remote responsive ferroresonant power supply 10. To turn the television receiver on, or to switch it from standby condition to full power condition, the on-state of a remote on/off command signal is received by a remote signal processor 96 along an input signal line 95. Upon receipt of the on-state of the command signal, the output signal line 17 of remote signal processor 96 goes low to turn on a transistor 16 having a base electrode coupled to signal line 17 through a resistor 97. A resistor 98 is coupled between the base and emitter electrodes of transistor 16. The collector electrode of transistor 16 is coupled to relay coil 15 and the emitter electrode is coupled to a terminal 94. At terminal 94, there is developed a +12 volt supply voltage that is available during both the on and off states of the remote command signal.

With transistor 16 conducting during the on-state of the command signal, current flows in relay coil 15 to energize relay 99 and actuate mechanical switch 14 to move it from the STANDBY terminal and make contact with the ON terminal. When mechanical switch 14 closes, the impedance from frequency control terminal 9 to earth ground 24 changes from that of resistor 13 to that of a short-circuit impedance. The control voltage $v_{f}$, being developed at terminal 9 is now substantially zero relative to ground 24.

When terminal 9 becomes short circuited to ground, operation of oscillator 7 switches from the standby-mode of operation to the on-mode of operation. During a start-up interval, after oscillator 7 switches to the on-mode of operation, but prior to synchronized operation, positive feedback provided by winding 22i of transformer 22 produces a free-running operation at a frequency between 5 and 10 KHz, a frequency lower than the horizontal deflection frequency, as described in the U.S. patent application of D. W. Luz et al., Ser. No. 174,943, filed Aug. 4, 1980, entitled "TELEVISION RECEIVER, PUSH-PULL INVERTER, FERRORESONANT TRANSFORMER POWER SUPPLY SYNCHRONIZED WITH HORIZONTAL DEFLECTION", herein incorporated by reference. A start-up resistor 58 is coupled between terminal 23 and the base of switching transistor Q1 to initiate switching action when switch 85 is initially closed.

In the start-up mode of operation, with oscillator 7 operating at 5 to 10 KHz frequency, output voltages are developed at the various DC supply voltage terminals coupled to the secondary windings 22c-22f of power transformer 22. Horizontal deflection generator 30 is sufficiently energized to begin developing scanning current $i_y$ in deflection winding 31 and to begin developing a synchronizing control pulse across winding 33a of pulse transformer 33.

The synchronizing pulse developed across winding 33a is transformer coupled by way of secondary windings 33b and 33c to inverter 20 to increase the frequency of operation to the horizontal deflection frequency and to synchronize operation with horizontal scanning current generation. Operation at the horizontal deflection frequency produces an increase in the output voltages across the secondary windings 22b-22f of transformer 22 to their normal, steady-state values.

The control circuit of oscillator 7 includes turnoff control transistors 42 and 43 coupled respectively to the bases of switching transistors Q1 and Q2, and saturable pulse transformer 33 having secondary windings 33b and 33c coupled respectively to the bases of turnoff control transistors 42 and 43 through respective resistors 48 and 49.

As described in the aforementioned Luz et al. U.S. patent application, the horizontal deflection current $i_y$ flowing through the primary winding 33a of pulse transformer 33 maintains the core 133 in magnetic saturation during each deflection cycle, except during those intervals near the two zero-crossover instants of the deflection current when the core comes out of saturation to produce output pulse voltages across secondary windings 33b and 33c. Near the zero-crossover instant within the trace interval, a positive voltage pulse is produced at the dotted terminal of winding 33b and is applied to control transistor 42 to turn the transistor on, thereby turning off switching transistor Q1. Near the zero-crossover instant during the retrace interval, a positive pulse is produced at the undotted terminal of winding 33c and is applied to control transistor 43 to turn the transistor on, thereby turning off switching transistor Q2. A diode 18 is coupled in series with a small inductor, such as ferrite bead, FB, across pulse transformer winding 33a for the purpose of keeping the core 133 magnetically unsaturated longer within the retrace interval. The pulse voltage during retrace produced across winding 33a is therefore broadened sufficient to turn on transistor 43 for the proper duration.

As described in the U.S. patent application of D. W. Luz, Ser. No. 288,237, filed July 29, 1981, entitled "DUTY-CYCLE CONTROLLED INVERTER POWER SUPPLY FOR A TELEVISION RECEIVER", herein incorporated by reference, a feedback voltage, representative of the current flowing in the collector path of switching transistor Q1 is developed across resistor 68. The feedback voltage developed across resistor 68 is applied to pulse transformer secondary winding 33b by way of a resistor 67 and after filtering by a capacitor 66, to provide voltage biasing of the base of turnoff transistor 42, to obtain a substantially 50% duty cycle switching of transistor Q1 under varying collector current levels. A similar feedback voltage to control the duty cycle switching of transistor Q2 is developed across resistor 71 and applied to pulse transformer secondary winding 33c by way of a resistor 70 after filtering by a capacitor 69.

An auxiliary voltage supply 19 of FIG. 1b develops the +12 volt supply voltage at terminal 94 for energizing remote control circuit 90 of FIG. 1a. In supply 19, an auxiliary winding 22h, magnetically tightly coupled to primary winding sections 22a and 22b of transformer 22, produces a square-wave voltage at the horizontal deflection frequency during steady-state operation of ferroresonant power supply 10. This voltage is rectified by a diode 87 and filtered by a capacitor 89 to produce the 12 volts DC at terminal 94.

To turn the television receiver off or into the standby mode of operation, the off-state of the remote command signal is received by remote signal processor 96 along input signal line 95 to produce a high signal level on output line 17. Transistor 16 becomes cut off, deenergizing relay 15, opening mechanical on/off switch 14 to disconnect the ON terminal of relay 99 from ground 24.

In the standby-mode of operation with mechanical on/off switch 14 disconnected from frequency control terminal 9, the current flowing in the main collector-to-emitter paths of switching transistors Q1 and Q2 flows from terminal 9 through resistor 13 to earth ground. During each half cycle of inverter operation, a ramp of current flows in resistor 13, producing a ramp, frequency control voltage $v_{fr}$ at terminal 9. The ram voltage $v_{fr}$ is coupled through respective capacitors 66 and 69 and pulse transformer secondary windings 33b and 33c to the base resistors 48 and 49 of turnoff control transistors 42 and 43.

During each half cycle of inverter operation, the ramp current flowing in transformer primary winding section 22a or 22b increases to a point where the ramp voltage $v_{fr}$ forward biases the appropriate turnoff control transistor 42 or 43 to shunt base current away from whichever one of the switching transistors Q1 and Q2 is conducting. That switching transistor then becomes cut off, to initiate the next half cycle of inverter operation.

By appropriate choice of the resistance value of resistor 13, a ramp voltage $v_{fr}$ is developed that produces inverter operation in the standby condition at a frequency substantially higher, 3 or more times, than the horizontal deflection frequency of the steady-state inverter operation. At the higher frequency of operation of the inverter 20 and of the power oscillator 7, at for example, 100 KHz, ferroresonant operation of ferroresonant load circuit 25 cannot be sustained due to the inability of the core 127 of saturable reactor 27 to reach the point of magnetic saturation within the shortened half cycle interval available during the higher frequency operation.

With ferroresonant operation of self-regulating load circuit 25 being disabled by the standby-mode, higher frequency, inverter operation, the output voltages being developed across secondary windings 22b–22f of power transformer 22 are reduced to a point where most if not all of the television receiver load circuits coupled to those windings are substantially deenergized.

Auxiliary power supply 19, however, still provides the +12 volts needed by remote control circuit 90 for operation in the standby-mode. Since auxiliary winding 22h is tightly coupled to primary winding sections 22a and 22b of transformer 22, the amplitude of the higher frequency square-wave voltage does not differ significantly from the on-mode amplitude. The voltage being developed at terminal 94 is therefore 12 volts even during standby operation.

We claim:

1. A television display system with a regulated power supply responsive to the state of a remote on/off command signal, comprising:

a source of first voltage;

a power oscillator coupled to said source for developing an alternating input voltage of a frequency determined by the frequency of operation of said oscillator, said oscillator including a frequency control terminal that controls the frequency of operation of said oscillator depending upon a control signal applied to said terminal;

means including a self-regulating circuit energized by said alternating input voltage for producing a regulated supply voltage;

a load circuit within said television display system energized by said regulated supply voltage; and remote control means coupled to said oscillator frequency control terminal and responsive to said remote on/off command signal for applying thereto said control signal such that during the on-state of said command signal said oscillator operates at a frequency that permits normal ferroresonant operation of said self-regulating circuit and during the off-state of said command signal said oscillator operates at a different frequency that disables ferroresonant operation of said self-regulating circuit to thereby substantially deenergize said television display system load circuit.

2. A television display system according to claim 1 wherein said power oscillator includes a switching arrangement having at least one main conductive path coupled to said frequency control terminal and wherein said remote control means includes an impedance coupled to said control terminal and means responsive to said remote command signal for decoupling said impedance from said control terminal only during one of the on and off-states of said command signal.

3. A television display system according to claim 2 wherein current in said main conductive path develops a voltage across said impedance that is applied to said switching arrangement as said control signal.

4. A television display system according to claim 2 wherein said power oscillator includes a transformer having a primary winding coupled to said switching arrangement and to said source of first voltage.

5. A television display system according to claim 1 wherein said source of first voltage is available during both the on and off-states of said remote command signal and wherein said power oscillator comprises a transformer and an inverter coupled to said first voltage source and to a primary winding of said transformer, operation of said inverter developing said alternating input voltage across said primary winding.

6. A television display system according to claim 5 including an auxiliary winding of said transformer and means coupled to said remote control means and responsive to the voltage across said auxiliary winding for energizing said remote control means during the off-state of said command signal.

7. A television display system according to claim 5 wherein said inverter includes first and second switches coupled to said primary winding in a push-pull arrangement, the main conductive path of at least one of the two switches being coupled to said frequency control terminal.

8. A television display system according to claim 7 wherein said remote control means includes an impedance coupled to said frequency control terminal and means responsive to said remote command signal for changing the value of said impedance when the state of said command signal changes.

9. A television display system according to claim 8 wherein said means for changing develops a substantial short circuit for current in said main current path when said command signal is in one of said on and off-states.

10. A television display system according to claims 1, 2, 5 or 7 wherein the frequency of operation of said power oscillator is the horizontal deflection frequency during the on-state of said command signal and is 3 or more times higher during the off-state.

11. A television display system according to claims 4, 5 or 7 wherein said transformer includes a secondary winding to which said self-regulating circuit is coupled as a regulating load to produce said regulated supply voltage across said secondary winding.

12. A television display system according to claim 11 including another secondary winding of said transformer coupled to said television display system load circuit and magnetically tightly coupled to the first-mentioned transformer secondary winding.

13. A television display system according to claim 11 wherein the frequency of operation of said power oscillator is the horizontal deflection frequency during the on-state of said command signal and is 3 or more times higher during the off-state.

* * * * *